(12) United States Patent
Tinney et al.

(10) Patent No.: US 12,061,788 B2
(45) Date of Patent: Aug. 13, 2024

(54) ELECTRONIC SYSTEMS, DEVICES AND METHODS FOR DISPLAYING PAPER DOCUMENTS

(71) Applicant: Hart InterCivic, Inc., Austin, TX (US)

(72) Inventors: Drew E. Tinney, Austin, TX (US); James M. Canter, Austin, TX (US); Jennifer S. Moreci, Pflugerville, TX (US)

(73) Assignee: Hart InterCivic, Inc., Austin, TX (US)

( * ) Notice: Subject to any disclaimer, the term of this patent is extended or adjusted under 35 U.S.C. 154(b) by 343 days.

(21) Appl. No.: 17/690,105

(22) Filed: Mar. 9, 2022

(65) Prior Publication Data

US 2023/0289050 A1 Sep. 14, 2023

(51) Int. Cl.
*G06F 3/0488* (2022.01)
*G06F 3/0485* (2022.01)
*G06F 3/16* (2006.01)
*G07C 13/00* (2006.01)

(52) U.S. Cl.
CPC .......... *G06F 3/0488* (2013.01); *G06F 3/0485* (2013.01); *G06F 3/16* (2013.01); *G07C 13/00* (2013.01)

(58) Field of Classification Search
CPC ..... G07C 13/00; G06F 3/0485; G06F 3/0488; G06F 3/16
See application file for complete search history.

(56) References Cited

U.S. PATENT DOCUMENTS

| | | | |
|---|---|---|---|
| 4,649,264 A * | 3/1987 | Carson | G07C 13/00 235/54 R |
| 5,189,288 A * | 2/1993 | Anno | G07F 17/3288 235/386 |
| 6,250,548 B1 * | 6/2001 | McClure | G07C 13/00 235/51 |
| 7,387,244 B2 | 6/2008 | Bolton et al. | |
| 8,413,880 B2 | 4/2013 | Kapsis | |
| 9,769,008 B1 * | 9/2017 | Petts | G06F 40/169 |
| 11,036,442 B2 * | 6/2021 | Gilbert | G06F 3/013 |
| 11,334,295 B2 | 5/2022 | Gilbert | |

(Continued)

OTHER PUBLICATIONS

Transparent Voting Machine Prototype, Juan Gilbert, https://www.youtube.com/watch?v=6_G8bdIXBAc (Year: 2020).*

(Continued)

*Primary Examiner* — Daniel I Walsh
(74) *Attorney, Agent, or Firm* — Egan, Enders & Huston LLP.

(57) ABSTRACT

The present disclosure provides various embodiments of electronic devices, electronic voting systems and methods of voting that enable paper documents to be displayed "under glass" for user review. In the embodiments disclosed herein, a paper viewing area is provided within an electronic device or electronic voting system for temporarily displaying a paper document to a user behind a transparent surface, which prevents the user from touching the paper document. In some embodiments, the transparent surface may be a touch screen and/or a display device of the electronic device or electronic voting system, and the paper document may be disposed behind and viewable through the touch screen and/or the display device when the paper document is displayed within the paper viewing area.

28 Claims, 11 Drawing Sheets

(56) References Cited

U.S. PATENT DOCUMENTS

| | | | |
|---|---|---|---|
| 11,734,032 B1* | 8/2023 | Brinkhoff | G06F 3/0481 |
| | | | 715/204 |
| 2004/0238632 A1 | 12/2004 | Homewood et al. | |
| 2005/0040962 A1* | 2/2005 | Funkhouser | G06F 1/1601 |
| | | | 340/815.4 |
| 2005/0056697 A1* | 3/2005 | Cummings | G07C 13/00 |
| | | | 235/386 |
| 2005/0218225 A1* | 10/2005 | Johnson | G06Q 50/26 |
| | | | 235/386 |
| 2007/0007340 A1* | 1/2007 | Mugica | G07C 13/00 |
| | | | 235/386 |
| 2008/0116270 A1* | 5/2008 | Wilson | G07C 13/00 |
| | | | 235/386 |
| 2008/0210746 A1* | 9/2008 | Homewood | G07C 13/00 |
| | | | 235/56 |
| 2009/0152339 A1* | 6/2009 | Hawkins | G07C 13/00 |
| | | | 235/51 |
| 2009/0166417 A1 | 7/2009 | Dammann et al. | |
| 2009/0173778 A1* | 7/2009 | Cummings | G07C 13/02 |
| | | | 235/51 |
| 2011/0035263 A1* | 2/2011 | Ramanathan | G06Q 30/02 |
| | | | 705/14.4 |
| 2014/0231513 A1* | 8/2014 | Brockhouse | G07C 13/00 |
| | | | 235/386 |
| 2022/0019330 A1* | 1/2022 | Chang | G06F 1/1643 |
| 2022/0398888 A1* | 12/2022 | Weigelt | G07D 7/162 |
| 2023/0289050 A1* | 9/2023 | Tinney | G07C 13/00 |
| 2024/0012502 A1* | 1/2024 | Niioka | G06F 3/0416 |

OTHER PUBLICATIONS

Juan Gilbert, Screen Captures YouTube Video Clip, "Transparent Voting Machine Prototype", www.https://youtube.com/watch?v=6_G8bd1XBAc&t=7s>, Nov. 26, 2020, 8 pgs.

ExpressVote XL, "Full-Face Universal Voting System", 2021, 2 pgs.

Smartmatic, "All-Inclusive Touchscreen Voting Solution", Obtained from Internet Mar. 4, 2022, 2 pgs.

Hart Intercivic, "eSlate", Equipment Type: Direct Recording Electronic (DRE), 2022, 11pgs.

Smartmatic, "Voting Solutions for All People (VSAP)", Equipment Type: Ballot Marking Device, Batch-Fed Optical Scanner, and Remote Ballot Marking, 2020, 8 pgs.

* cited by examiner

ELECTRONIC SYSTEMS, DEVICES AND METHODS FOR DISPLAYING PAPER DOCUMENTS

BACKGROUND OF THE INVENTION

The present disclosure relates to systems, devices and methods for displaying paper documents. More specifically, the present disclosure provides electronic devices, electronic voting systems and methods that enable paper documents to be displayed within the same device or system that displays information and/or receives touch input from a user.

A variety of voting systems and processes for use in various federal, state, county and local elections are well known. For example, one common voting method allows a voter to mark their voting selections on a paper ballot. Once voting selections are complete, the voter's hand-marked paper ballot may be electronically scanned at a voting precinct or an official polling location to create an electronic cast vote record of the voter's marked selections. In some cases, absentee or by-mail voters may mail their marked paper ballots into a central election office for scanning and additional election processing (e.g., official counting, tabulation, reporting, auditing, etc.).

Alternatively, voters may utilize an electronic voting system located at a voting precinct or an official polling location to specify their voting preferences. For example, a voter may make voting selections electronically on an electronic voting system or device. Once voting selections are complete, the voter's voting selections may be printed at the polling location on a printed record, such as a machine-marked paper ballot containing the voter's voting selections, a machine-marked summary ballot containing a summary of the voter's voting selections, etc. In some cases, the printed record may be reviewed by the voter before casting their vote. Once the vote is cast, an electronic cast vote record of the voter's selections is created and either temporarily stored within the electronic voting system or provided to a central election office for additional election processing.

The printed records generated at the polling location may be utilized for a variety of purposes. For example, a printed record of the voter's selections may be provided to the voter to confirm the selections to be electronically cast. In another example, a printed record may be electronically scanned to create an electronic cast vote record of the voter's marked selections. The electronic cast vote records may then be transmitted (either manually or electronically) from the polling location to a central election office for official counting, tabulation, reporting, auditing, etc. In some cases, the printed records may also be used for manual counting, audit and/or recount purposes. As such, printed records provide a voter-verified paper trail for use in a wide variety of voting systems and methods.

Printed records are currently used in a variety of electronic voting systems. In some electronic voting systems, the printed record is given to the voter for review. This approach has several drawbacks. Providing the printed record to the voter, for example, opens up the possibility that the voter mistakes the printed record for a receipt and leaves with the printed record without casting their vote (the "fleeing voter" scenario). This approach also fails to accommodate voters with dexterity issues and/or those who cannot physically hold the printed record to visually review.

In other electronic voting systems, the printed record is displayed to the voter behind a transparent surface (e.g., plastic, glass, etc.) that enables the voter to review the voting selections recorded on the printed record without actually providing the printed record to the voter. The eSlate voter-verifiable paper audit trail (VVPAT) device provided by Hart InterCivic Inc., the ExpressVote XL provided by Election Systems and Software, LLC and the Premium Voting Machine provided by Smartmatic represent examples of electronic voting systems that display printed records "under glass" for voter review. Although these "under glass" systems prevent the fleeing voter scenario and enable voters with dexterity issues to review the printed record displayed under glass, they each require a separate hardware device that acts as a container for the printed record. This is undesirable for several reasons.

First, requiring a separate hardware device or container for printed record review increases the size and/or the number of devices that must be deployed and set up at an election site. This is generally undesirable because of the added complexity and cost. In the "under glass" systems mentioned above, for example, the separate hardware device used for printed record review is an add-on peripheral, which is provided alongside the electronic voting system device (e.g., a direct recording electronic (DRE) voting machine or electronic ballot marking device (BMD)). Even if the hardware device used for printed record review were integrated with the electronic voting system device, the need for a separate hardware device for printed record review increases the size of the electronic voting system device and/or the space required for each voting station. However, smaller devices are generally desirable for storage, transport and set up by poll workers. Finally, providing a separate hardware device for printed record review alongside a electronic voting system device requires the voter to divide their attention and redirect their line of sight between different viewing areas. This adds unnecessary complexity to the voting process and reduces the likelihood that the printed record is reviewed by the voter.

SUMMARY OF THE INVENTION

The present disclosure provides various embodiments of electronic devices, electronic voting systems and methods of voting that enable paper documents to be displayed "under glass" for user review. In the embodiments disclosed herein, a paper viewing area is provided within an electronic device or electronic voting system for temporarily displaying a paper document to a user behind a transparent surface, which prevents the user from touching the paper document. In some embodiments, the transparent surface may be a touch screen and/or a display device of the electronic device or electronic voting system, and the paper document may be disposed behind and viewable through the touch screen and/or the display device when the paper document is displayed within the paper viewing area. A wide variety of paper documents may be displayed within the paper viewing area of the electronic system or device described herein, including but not limited to, paper documents related to voting (e.g., printed records, unmarked paper ballots, marked paper ballots, etc.), archival documents and other paper documents for which secure display and/or review is beneficial.

The electronic voting system described herein provides several advantages over conventional electronic voting systems by displaying a paper document behind the touch screen and/or the display device. In addition to preventing the user from touching the paper document, for example, the electronic voting system described herein provides a single viewing angle with which a user can view both the paper document and the information displayed on the display device, while the paper document is displayed within the paper viewing area behind the touch screen and/or the display device. It also enables the user to provide touch input to the touch screen while the paper document is displayed within the paper viewing area. This prevents the user from having to divide their attention and redirect their line of sight between different viewing areas, as would be the case if the paper document were instead displayed in a separate hardware device or container positioned alongside the electronic voting system. Finally, providing a paper viewing area, which coincides with the touch screen and the display device, enables the size of the electronic voting system described herein to be reduced compared to other "under glass" systems that display paper documents in a separate hardware device or container positioned alongside the electronic voting system.

According to one embodiment, an electronic device in accordance with the present disclosure may generally include a display device configured to display information to a user; a touch screen overlying the display device and configured to receive touch input from the user; a paper viewing area configured to display a paper document behind a transparent surface, which prevents the user from touching the paper document; and an external housing that encompasses the display device, the touch screen and the paper viewing area.

In some embodiments, the touch screen may include a touch screen overlay, which is positioned above and in contact with the transparent surface. For example, the touch screen may include a resistive or capacitive touch screen overlay for receiving the touch input from the user.

The paper document may generally be disposed behind and viewable through the touch screen when the paper document is displayed within the paper viewing area. In some embodiments, the display device may be positioned behind and spaced apart from the touch screen, such that the paper document is disposed between the touch screen and the display device when the paper document is displayed within the paper viewing area. In such embodiments, the display device may be implemented as a non-transparent display device. In other embodiments, the display device may be positioned behind and in contact with the touch screen, such that the paper document is disposed behind and viewable through the touch screen and the display device when the paper document is displayed within the paper viewing area. In these embodiments, a transparent display device may be used to implement the display device.

According to another embodiment, an electronic voting system in accordance with the present disclosure may generally include a display device configured to display voting information; a touch screen overlying the display device and configured to receive touch input; and a paper viewing area configured to temporarily display a paper document, wherein the paper document is disposed behind and viewable through the touch screen when the paper document is displayed within the paper viewing area.

In some embodiments, the paper viewing area may be smaller than a surface area of the display device, and the display device may be configured to display the voting information and/or graphical user interface (GUI) components around a periphery of the paper viewing area when the paper document is displayed within the paper viewing area. For example, the display device may be configured to display voting information and/or GUI components along one or more sides (e.g., a top, bottom, left and/or right side) of the paper viewing area when the paper document is displayed within the paper viewing area. In these embodiments, a transparent or a non-transparent display device may be used to implement the display device.

In other embodiments, the paper viewing area may encompass most, if not all, of the surface area of the display device, and the display device may be configured to display the voting information within the paper viewing area when the paper document is displayed within the paper viewing area. In such embodiments, a transparent display device may be used to display voting information over the paper document displayed within the paper viewing area.

In some embodiments, the touch screen may be configured to receive touch input only around the periphery of the paper viewing area when the paper document is displayed within the paper viewing area. In other embodiments, the touch screen may be configured to receive touch input across the entire surface area of the touch screen when the paper document is displayed within the paper viewing area.

In some embodiments, the electronic voting system may further include an external housing encompassing the display device, the touch screen, and the paper viewing area. Other components may also be included within the external housing of the electronic voting system. In some embodiments, for example, a paper feeder mechanism may be included within the external housing of the electronic voting system. The paper feeder mechanism may be configured to provide the paper document to the paper viewing area to temporarily display the paper document, and subsequently remove the paper document from the paper viewing area. In other embodiments, a print head may be included within the external housing of the electronic voting system for printing voting selections on the paper document displayed within the paper viewing area.

A wide variety of paper documents may be displayed within the paper viewing area of the electronic voting system. In one embodiment, the paper document may be a printed record of voting selections, which were previously made by a voter via the touch input received on the touch screen. In such an embodiment, the printed record may be displayed within the paper viewing area to enable the voter to review the voting selections recorded on the printed record before casting their vote via the touch screen. In some embodiments, a print head included within the external housing may be configured to generate the printed record displayed within the paper viewing area. In other embodiments, the printed record may be generated by an external printer. In such embodiments, the printed record generated by the external printer may be provided to the electronic voting system via an input/output (I/O) port on the external housing.

In some embodiments, the display device may be configured to display graphical user interface (GUI) components along one or more sides of the paper viewing area when the paper document is displayed within the paper viewing area to assist the voter in reviewing the voting selections recorded on the printed record. For example, the GUI components may include a display element overlying the voting selections recorded on the printed record and one or more buttons, which enable the voter to scroll the display element through the voting selections recorded on the printed record. In some embodiments, the GUI components may further include a text box. As the display element scrolls through the voting selections recorded on the printed record, a voting selection currently highlighted by the display element may be displayed in the text box for voter review. In some embodiments, the electronic voting system may be configured to provide audio feedback of the voting selections, as the display element scrolls through the voting selections recorded on the printed record.

In another embodiment, the paper document may be an unmarked paper ballot, which is displayed within the paper viewing area to enable a voter to make voting selections via the touch screen. In some embodiments, a print head included within the external housing may be configured to print the voting selections on the unmarked paper ballot to generate a machine-marked paper ballot. In other embodiments, an external printer may be configured to print the voting selections on the unmarked paper ballot to generate a machine-marked paper ballot, which is provided to the electronic voting system via an input/output (I/O) port on the external housing. Regardless of whether the machine-marked paper ballot is generated by an internal print head or an external printer, the machine-marked paper ballot may be displayed within the paper viewing area to enable the voter to review the voting selections printed on the machine-marked paper ballot before casting their vote via the touch screen.

According to yet another embodiment, a method of voting using an electronic voting system comprising a display device, a touch screen overlying the display device and a paper viewing area is provided herein. In general, the method may include: displaying voting information on the display device; receiving touch input on the touch screen; and temporarily displaying a paper document within the paper viewing area, wherein the paper document is disposed behind and viewable through the touch screen when the paper document is displayed within the paper viewing area.

In some embodiments, the paper viewing area may be smaller than the surface area of the display device and the touch screen, and said displaying voting information may include displaying the voting information around a periphery of the paper viewing area when the paper document is displayed within the paper viewing area. For example, the voting information may be displayed around one or more sides (e.g., along the top, bottom, left and/or right side) of the paper viewing area when a paper document is displayed within the paper viewing area.

In some embodiments, said receiving touch on the touch screen may include receiving voting selections from a voter via the touch input received on the touch screen. In some embodiments, the touch input received from the voter may be received across the entire surface area of the touch screen.

In some embodiments, said temporarily displaying a paper document may include temporarily displaying a printed record of the voting selections within the paper viewing area, so that the voter can review the voting selections recorded on the printed record before casting their vote via the touch screen. In some embodiments, the method may further include displaying graphical user interface (GUI) components along one or more sides of the paper viewing area when the printed record is displayed within the paper viewing area to assist the voter in reviewing the voting selections recorded on the printed record. For example, said displaying the GUI components may include displaying a display element overlying the voting selections recorded on the printed record, and displaying one or more buttons utilized by the voter to scroll the display element through the voting selections recorded on the printed record. In some embodiments, said displaying the GUI components may further include displaying a text box. In such embodiments, the method may further include displaying, within the text box, a voting selection currently highlighted by the display element as the display element scrolls through the voting selections recorded on the printed record. In some embodiments, the method may further include providing audio feedback of the voting selections to the voter, as the display element scrolls through the voting selections recorded on the printed record.

In other embodiments, said temporarily displaying a paper document may include temporarily displaying an unmarked paper ballot within the paper viewing area, so that the voter can make the voting selections via the touch input received on the touch screen. In some embodiments, the method may further include generating a machine-marked paper ballot by printing the voting selections on the unmarked paper ballot. In such embodiments, said temporarily displaying a paper document may further include temporarily displaying the machine-marked paper ballot within the paper viewing area, so that the voter can review the voting selections on the machine-marked paper ballot before casting their vote via the touch screen.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

The present disclosure provides various embodiments of electronic devices, electronic voting systems and methods of voting that enable paper documents to be displayed "under glass" for user review. In the embodiments disclosed herein, a paper viewing area is provided within an electronic device or electronic voting system for temporarily displaying a paper document to a user behind a transparent surface, which prevents the user from touching the paper document. In some embodiments, the transparent surface may be a touch screen and/or a display device of the electronic device or electronic voting system, and the paper document may be disposed behind and viewable through the touch screen and/or the display device when the paper document is displayed within the paper viewing area. A wide variety of paper documents may be displayed within the paper viewing area of the electronic system or device described herein, including but not limited to, paper documents related to voting (e.g., printed records, unmarked paper ballots, marked paper ballots, etc.), archival documents and other paper documents for which secure display and/or review is beneficial.

The electronic voting system described herein provides several advantages over conventional electronic voting systems by displaying a paper document behind the touch screen and/or the display device. In addition to preventing the user from touching the paper document, for example, the electronic voting system described herein provides a single viewing angle with which a user can view both the paper document and the information displayed on the display device, while the paper document is displayed within the paper viewing area behind the touch screen and/or the display device. It also enables the user to provide touch input to the touch screen while the paper document is displayed within the paper viewing area. This prevents the user from having to divide their attention and redirect their line of sight between different viewing areas, as would be the case if the paper document were instead displayed in a separate hardware device or container positioned alongside the electronic voting system. Finally, providing a paper viewing area, which coincides with the touch screen and the display device, enables the size of the electronic voting system described herein to be reduced compared to other "under glass" systems that display paper documents in a separate hardware device or container positioned alongside the electronic voting system.

Figure 1A:
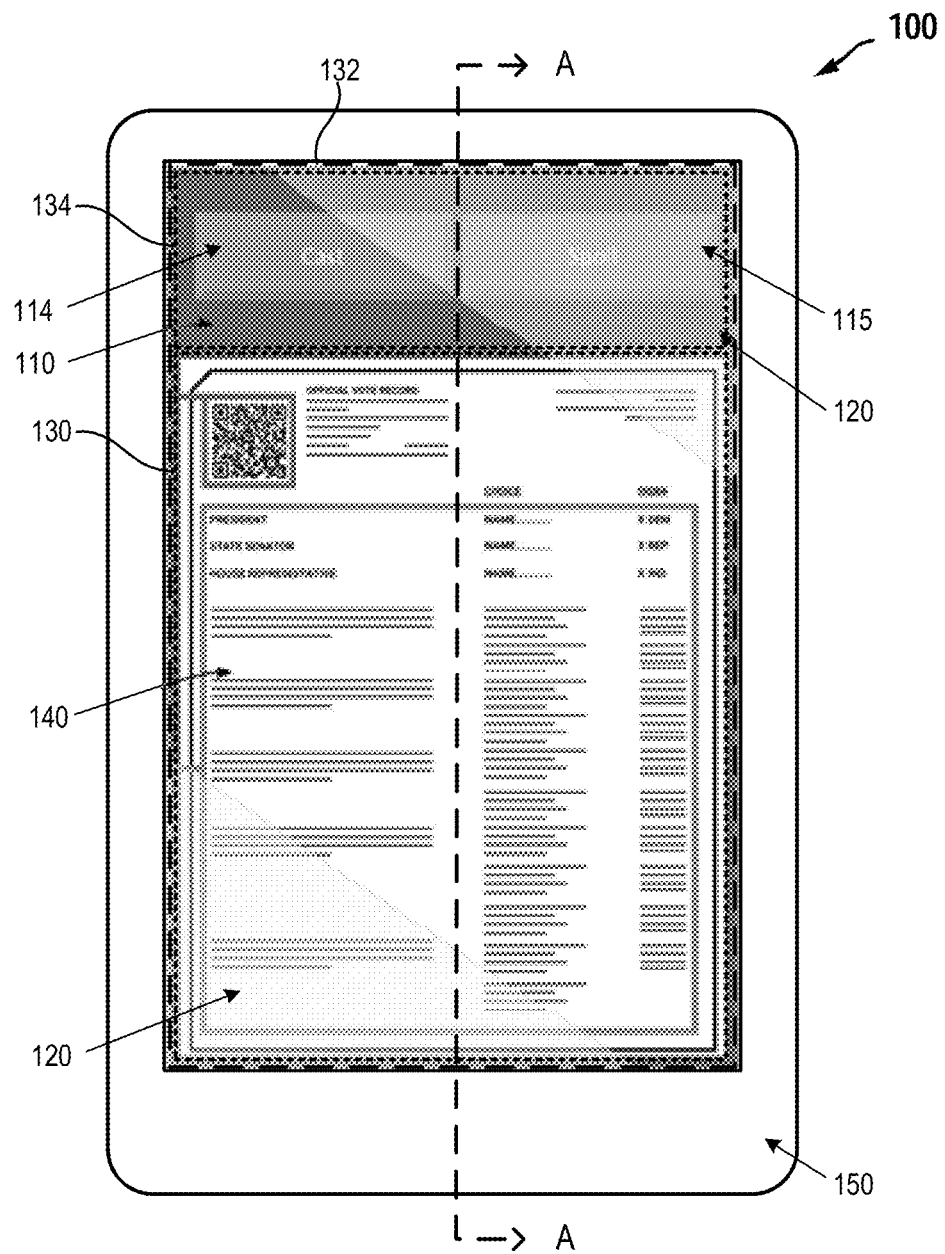
FIG. 1A is a front view of an electronic device having a display device, a touch screen and a paper viewing area in accordance with one embodiment of the present disclosure.

An electronic device 100 having a display device 110, a touch screen 120 and a paper viewing area 130 in accordance with one embodiment of the present disclosure is illustrated in FIGS. 1A-1D. As shown in FIG. 1A, the display device 110 may be generally configured to display information to a user. The touch screen 120 overlies the display device 110 and is configured to receive touch input from the user. The paper viewing area 130 is configured to display a paper document 140 behind a transparent surface, which prevents the user from touching the paper document. Depending on the technology used to implement the display device 110, the transparent surface may include the touch screen 120 and/or the display device 110.

The display device 110 and the touch screen 120 may utilize any of a wide variety of display and touch screen technologies known in the art. In some embodiments, the display device 110 may be implemented as a liquid crystal display (LCD) device, a light-emitting diode (LED) display device, an LED backlit or side lit LCD device, a thin-film transistor (TFT) LCD device, an organic LED (OLED) display device, an AMOLED display device, etc. Other display technologies known in the art and not specifically mentioned herein may also be used to implement the display device 110. The touch screen 120 may generally include a touch screen overlay 122, such as a resistive or capacitive touch screen overlay, which is positioned above and in contact with the transparent surface. Other touch screen technologies known in the art and not specifically mentioned herein may also be used to implement the touch screen 120.

In some embodiments, an additional overlay (not shown) may be provided over the transparent surface to adjust the transparency of the transparent surface. In one embodiment, for example, a polymer-dispersed liquid crystal (PDLC) film overlay may be provided over the transparent surface to adjust the transparency of the transparent surface to enable or restrict viewing of the paper document 140 displayed behind the transparent surface. If provided, a PDLC film overlay may be utilized as a black-out screen for privacy purposes. This may be particularly useful in accessibility situations, for example, in which a voter listening to an audio review of their voting selections does not wish others to see their voting selections displayed on the display screen.

In some embodiments (not shown), the electronic device 100 may include, or may be capable of interfacing with, additional input devices that allow a user to provide input to the electronic device 100. In addition to touch screen 120, for example, the electronic device 100 may include buttons, rollers, track pads or other user input features that enable a user to provide input to the electronic device 100. In addition or alternatively, the electronic device 100 may include an input/output connector (such as, e.g., a USB port), which may be used to connect a peripheral input device to the electronic device 100. In one embodiment, an accessible tactile interface (ATI) or other disabled access unit (DAU) may be connected to an input/output connector on the electronic device 100 to enable users with accessibility issues to provide input to, and interact with, the electronic device 100.

As noted above, the electronic device 100 may display the paper document 140 behind the touch screen 120 and/or the display device 110, depending on the technology used to implement the display device 110. In some embodiments, the paper document 140 may be disposed behind and viewable through the touch screen 120 (see, e.g., FIG. 1B) when a non-transparent display device is used to implement the display device 110. In other embodiments, the paper document 140 may be disposed behind and viewable through the touch screen 120 and the display device 110 (see, e.g., FIG. 1C) when a transparent (or see-through) display device is used to implement the display device 110.

A transparent (or see-through) display device is an electronic display that allows the user to see what is shown on the display device while still being able to see through the display device. There are currently two different types of transparent display technology: absorptive and emissive devices. Absorptive devices (such as LCD devices) work by selectively reducing the intensity of the light passing through the display, while emissive devices (such as LED display devices) selectively add to the light passing through the display. For example, an LCD panel can be made "see-through" without applied voltage when a twisted nematic LCD is fitted with crossed polarizers. Unlike LED transparent displays, which have two layers of glass on both sides of a set of addressable LEDs, LCD transparent displays do not produce their own light but only modulate incoming light from another light source (e.g., side mounted LEDs). Some transparent display technologies combine both absorptive (LCD) and emissive (LED) devices to overcome the limitations inherent to either one.

Figure 1B:
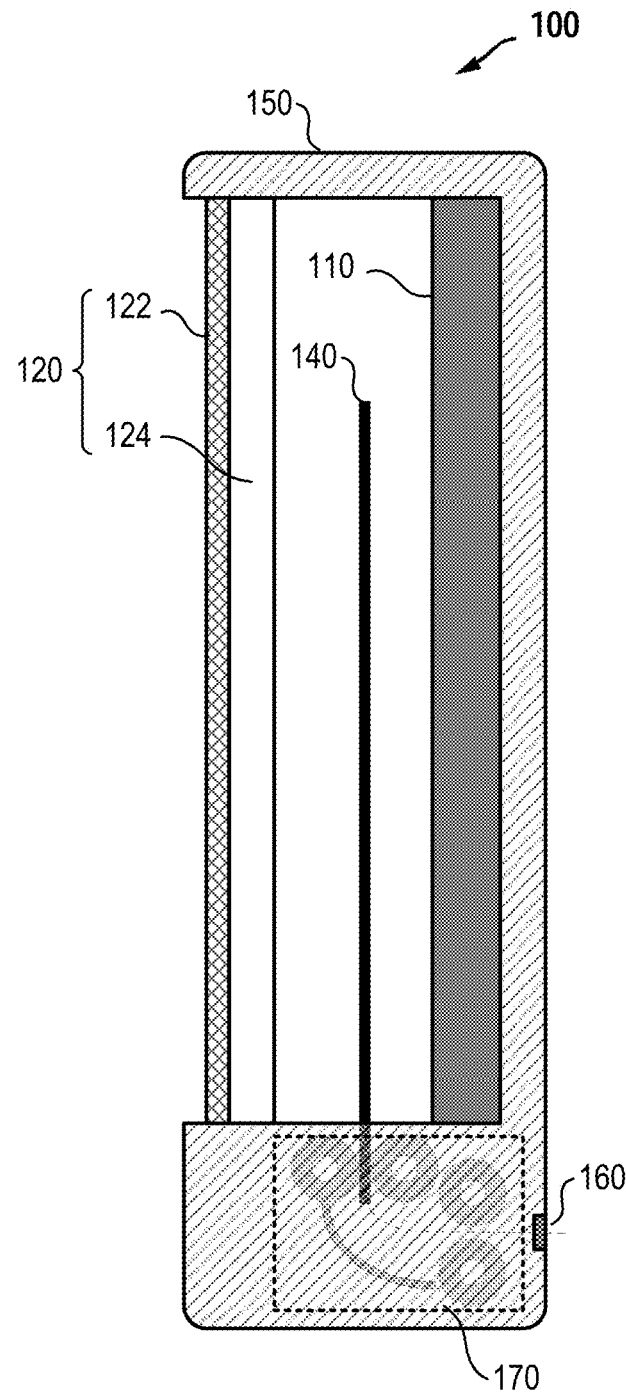
FIG. 1B is a cross-sectional view through line A-A of FIG. 1A, illustrating an embodiment in which a paper document is disposed behind and viewable through the touch screen of the electronic device when the paper document is displayed within the paper viewing area.

FIG. 1B is a cross-sectional view through line A-A of FIG. 1A, illustrating the paper document 140 disposed behind and viewable through the touch screen 120 of the electronic device 100 when the paper document 140 is displayed within the paper viewing area 130. In the embodiment shown in FIG. 1B, the touch screen 120 includes a transparent surface 124 (e.g., a glass substrate) having a touch screen overlay 122, and the display device 110 is positioned behind and spaced apart from the touch screen 120. The embodiment shown in FIG. 1B may be utilized when a non-transparent display device (e.g., a backlit LCD device) is used to implement the display device 110. When a non-transparent display device 110 is utilized, the paper document 140 is disposed between the touch screen 120 and the display device 110 when the paper document 140 is displayed within the paper viewing area 130, as shown in FIG. 1B.

Figure 1C:
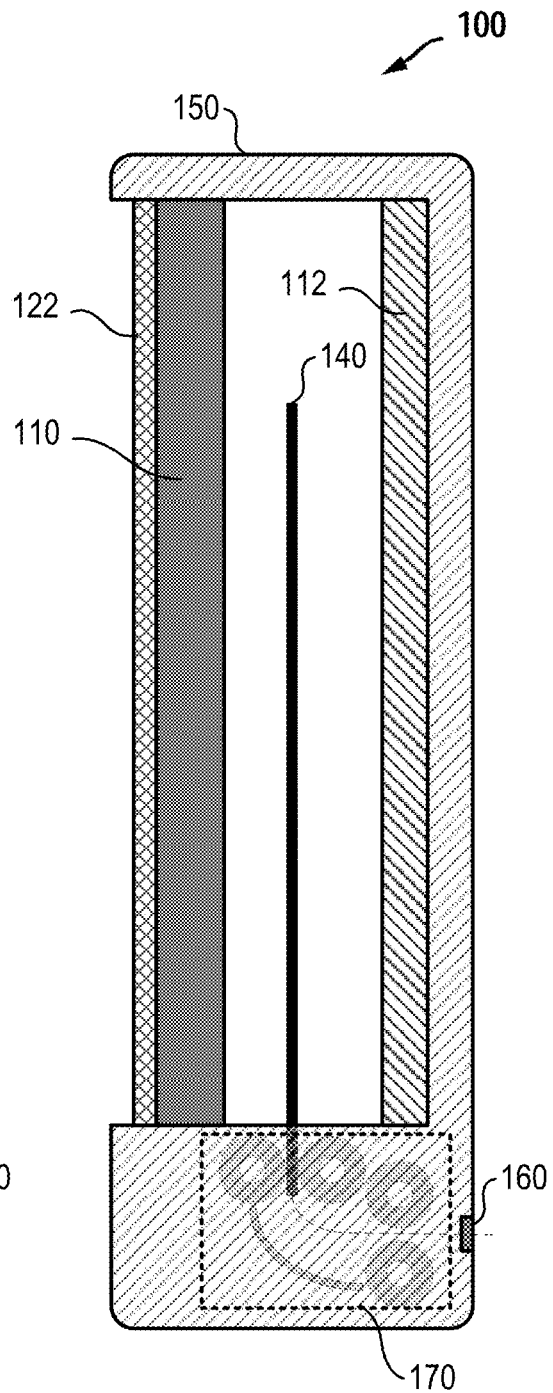
FIG. 1C is a cross-sectional view through line A-A of FIG. 1A, illustrating an embodiment in which a paper document is disposed behind and viewable through the touch screen and the display device of the electronic device when the paper document is displayed within the paper viewing area.

FIG. 1C is a cross-sectional view through line A-A of FIG. 1A, illustrating the paper document 140 disposed behind and viewable through the touch screen 120 and the display device 110 of the electronic device 100 when the paper document 140 is displayed within the paper viewing area 130. In the embodiment shown in FIG. 1C, the touch screen 120 includes a touch screen overlay 122 and the display device 110 is positioned behind and in contact with the touch screen overlay 122. The embodiment shown in FIG. 1C may be utilized when a transparent display device (e.g., a transparent LCD or LED display device) is used to implement the display device 110. When a transparent display device 110 is utilized, the paper document 140 is disposed behind and viewable through the touch screen 120 and the display device 110 when the paper document 140 is displayed within the paper viewing area 130. In some embodiments, the paper document 140 may be disposed between the display device 110 and a background surface 112, as shown in FIG. 1C.

The display device 110 may be configured to display a wide variety of information to the user. In some embodiments, the display device 110 may be configured to display voting information to a voter or an election official. Examples of voting information that may be displayed to a voter on the display device 110 include, but are not limited to, electronic ballots, instructions for utilizing electronic ballots, summaries of voting selections made by the voter on an electronic ballot, etc. In addition to voting information, the display device 110 may be configured to display various graphical user interface (GUI) components, which enable a voter to enter information, navigate through an electronic ballot, make voting selections on an electronic ballot and cast their vote once voting selections are reviewed and confirmed. Voting information utilized by election officials may also be displayed on the display device 110 such as equipment configuration options, ballot configuration options, etc. Although described below in the context of voting, the display device 110 is not limited to displaying voting information to a voter or election official, and may be alternatively configured to display other types of information and/or GUI components to a user.

In some embodiments, the electronic device 100 shown in FIGS. 1A-1D may be an electronic voting system and the voting information displayed on the display device 110 may enable a voter to make voting selections in an election. For example, the display device 110 may display an electronic ballot, which a voter may use to make voting selections in an election. The voter may utilize the touch screen 120 (and/or another input device) to mark their voting selections on the electronic ballot. Once voting selections are complete, a printed record) of the voter's voting selections may be printed and displayed, for example, within the paper viewing area 130 of the electronic device 100. FIG. 1A illustrates one embodiment of a printed record (i.e., a paper document 140) that may be displayed within the paper viewing area 130 of the electronic device 100, wherein the printed record contains a summary of the voter's voting selections. Other paper documents may be displayed within the paper viewing area 130 of the electronic device 100, as described in more detail below.

As noted above, printed records may be utilized for a variety of purposes. For example, a voter may use a printed record to review and confirm their voting selections before casting their ballot. In another example, a printed record may be scanned to create an electronic cast vote record, which is transmitted (either manually or electronically) to a central election office for official counting, tabulation, reporting, auditing, etc. In some cases, printed records may also be used for manual counting, audit and/or recount purposes. As such, printed records provide a voter-verified paper trail.

As noted above, conventional electronic voting systems either provide the printed record directly to the voter, or display the printed record "under glass" in a separate hardware device or container. Each of these methods has its own disadvantages. For example, electronic voting systems that provide the printed record directly to the voter risk the "fleeing voter" scenario and fail to accommodate voters with dexterity issues and/or those who cannot physically hold the printed record to visually review. On the other hand, electronic voting systems that display the printed record "under glass" in a separate hardware device or container: (a) increase the number of devices that must be deployed and set up at an election site, (b) increase the size of the electronic voting system device and/or the space required for each voting station, and/or (c) require the voter to divide their attention and redirect their line of sight between different viewing areas.

When used as an electronic voting system, the electronic device 100 shown in FIGS. 1A-1D improves upon conventional electronic voting systems, in at least one respect, by displaying the printed record (or another paper document 140) within a paper viewing area 130, which coincides with the touch screen 120 and the display device 110. More specifically, the electronic device 100 improves upon conventional electronic voting systems by securely displaying the printed record (or another paper document) behind the touch screen 120 and/or the display device 110 of the electronic device 100.

In addition to preventing the voter from touching the printed record, the electronic device 100 provides a single viewing angle (see, e.g., FIG. 3B) with which a voter can view the printed record (or another paper document 140) and the information displayed on the display device 110. It also enables the voter to provide touch input to the touch screen 120 while the printed record (or another paper document 140) is displayed within the paper viewing area 130. This prevents the voter from having to divide their attention and redirect their line of sight between different viewing areas, as would be the case if the printed record were displayed in a separate hardware device or container positioned alongside the display device. Finally, providing a paper viewing area 130, which coincides with the touch screen 120 and the display device 110, enables the size of the electronic device 100 to be reduced compared to conventional electronic voting systems that display printed records "under glass" in a separate hardware device or container positioned alongside the display device. In some cases, the size of the display device 110 may also enable full-size printed records (e.g., printed records recorded on larger width paper sizes, such as 8.5" wide paper) to be displayed "under glass" rather than the 3"-4" paper strips, which are typically used in conventional "under glass" systems to display limited amounts of voting information.

By displaying a printed record within paper viewing area 130, the electronic device 100 shown in FIGS. 1A-1D enables the voter to review the voting selections recorded on the printed record before casting their ballot. In the embodiments shown in FIGS. 1A and 1D, the paper viewing area 130 is smaller than the surface area 132 of the display device 110 and the touch screen 120. This enables voting information and GUI components (e.g., buttons, text boxes, images, etc.) to be displayed around a periphery of the paper viewing area 130 when the printed record (or another paper document 140) is displayed within the paper viewing area 130.

As shown in FIG. 1A, for example, the paper viewing area 130 is positioned near the bottom edge of the display device 110 and the touch screen 120, enabling GUI components to be displayed in an upper portion 134 of the display device 110 positioned above the paper viewing area 130. A wide variety of GUI components may be displayed within the upper portion 134 of the display device 110, including but not limited to, buttons, text boxes, images, etc. The GUI components shown in FIG. 1A include a "cast" button 114 and a "spoil" button 115. Once a voter reviews and confirms the voting selections recorded on the printed record displayed within the paper viewing area 130, the voter may cast their ballot by touching the "cast" button 114 displayed on the display device 110. Alternatively, the voter may cancel their ballot by touching the "spoil" button 115 displayed on the display device 110.

Figure 1D:
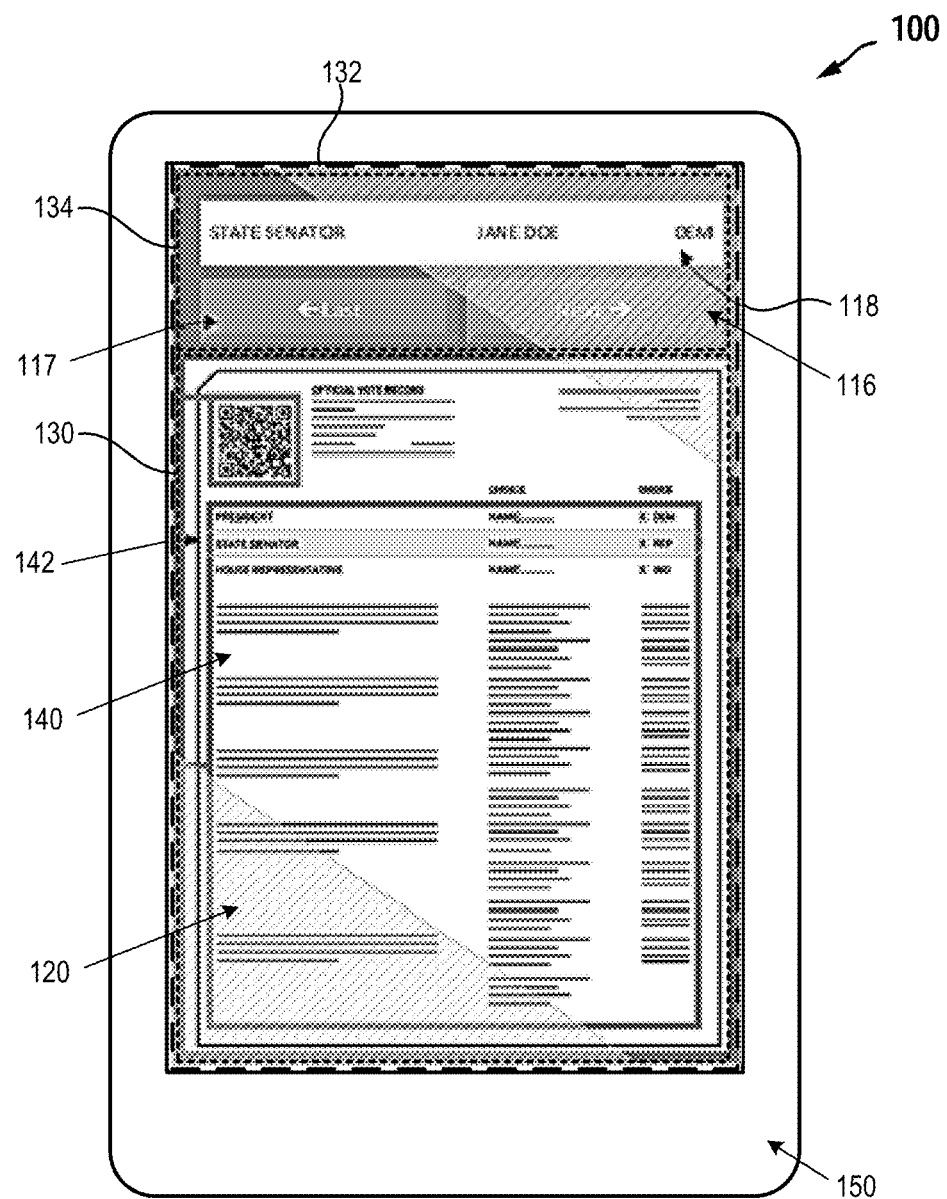
FIG. 1D illustrates the electronic device of FIG. 1A having a transparent display device, wherein the transparent display device is used to overlay display information over the paper document is displayed within the paper viewing area.

In some embodiments, additional GUI components may be displayed on the display device 110 to assist the voter in reviewing the voting selections recorded on the printed record displayed within the paper viewing area 130. As shown in FIG. 1D, for example, a "next" button 116, a "last" button 117 and a text box 118 may be displayed within the upper portion 134 of the display device 110. In addition, a display element 142 (such as, e.g., a visual cursor, highlight, box, etc.) may be displayed on the display device 110 overlying the voting selections. When a printed record is displayed within the paper viewing area 130, as shown in FIG. 1D, a voter may use the "next" button 116 and the "last" button 117 to scroll the display element 142 through the voting selections recorded on the printed record. The vote selection currently highlighted by the display element 142 (e.g., the vote selection for "State Senator" in FIG. 1D) may be displayed in the text box 118 for voter review. In some embodiments, the electronic device 100 may provide audio feedback to the voter, informing the voter of each vote selection, as the voter uses the "next" button 116 and the "last" button 117 to scroll the display element 142 through the voting selections recorded on the printed record. The embodiment shown in FIG. 1D improves the voter review process by providing a visual cursor (or other display element 142) that overlays the printed record, while simultaneously providing electronic confirmation (e.g., within the text box 118) and audio feedback of the voter's voting selections, thereby allowing a complete trusted review of the printed record. This is not currently provided in conventional "under glass" systems or other methods in which the printed record is not visually accessible.

It is recognized that the display device 110, touch screen 120 and paper viewing area 130 are not limited to displaying voting information and/or GUI components in the upper portion 134 of the display device 110, as shown in FIGS. 1A and 1D. In some embodiments (see, e.g., FIGS. 2B-2D), a paper viewing area 130 which is smaller than the surface area 132 of the display device 110 and the touch screen 120 may be positioned in a such manner that enables voting information and GUI components to be displayed below and/or along one or more sides of the paper viewing area 130 when a paper document 140 is displayed within the paper viewing area 130. Although the paper viewing area 130 shown in FIGS. 1A, 1D and FIGS. 2A-2D is roughly 3 times larger than the portion (e.g., 134, 135, 136 and 137) of the display device 110 displaying voting information and/or GUI components, the techniques described herein are not strictly limited to such a split. In some embodiments, the display device 110 may be split roughly equally along the Y-axis to provide an equally sized paper viewing area 130 and graphical display area. Such a configuration may enable an electronic summary of the voter's voting selections to be displayed alongside a printed record of the voting selections for easy one-to-one comparison.

In other embodiments (not shown), the paper viewing area 130 may encompass most, if not all, of the surface area 132 of the display device 110 and the touch screen 120. In such embodiments, the voting information and/or GUI components may be displayed within the paper viewing area 130 when the printed record (or another paper document 140) is displayed within the paper viewing area 130. To encompass all such embodiments, the touch screen 120 may be configured to receive touch input: (a) only around the periphery of the paper viewing area 130, or (b) across the entire surface area of the touch screen 120 when a printed record (or another paper document 140) is displayed within the paper viewing area 130.

Although a printed record containing a summary of the voter's voting selections is illustrated in FIG. 1A, other paper documents 140 related to voting may be displayed within the paper viewing area 130 of the electronic device 100. In some embodiments, a machine-marked paper ballot may be displayed within the paper viewing area 130 of the electronic device 100. In other embodiments, an unmarked paper ballot may be displayed within the paper viewing area 130 of the electronic device 100.

When an unmarked paper ballot is displayed within the paper viewing area 130, a voter may use touch screen 120 to make voting selections electronically on the unmarked paper ballot. In some embodiments, the voter's selections may be displayed on the display device 110 over the unmarked paper ballot, if a transparent display device is utilized and positioned in front of the unmarked paper ballot. In other embodiments, the voter's selections may be illuminated by the display device 110 through the unmarked paper ballot, if a non-transparent display device is utilized and positioned behind the unmarked paper ballot. Once voting selections are complete, an internal print head or external printer (not shown in FIGS. 1A-1D) may mark or print the voting selections on the unmarked paper ballot to generate a machine-marked paper ballot. In some embodiments, the machine-marked paper ballot may be displayed within the paper viewing area 130 to enable the voter to review and confirm their voting selections before casting their ballot via the touch screen 120.

Although beneficial for reviewing paper documents related to voting, other paper documents 140, such as archival documents and other paper documents that may be fragile or security sensitive, may also be displayed securely within the paper viewing area 130 of the electronic device 100 shown in FIGS. 1A-1D. In some embodiments, a user may utilize the display device 110 and/or the touch screen 120 to electronically annotate or catalogue the paper document 140 while the paper document 140 is securely displayed within the paper viewing area 130. In one embodiment, the annotation of the paper document 140 may include annotations made by an election official during a re-count, vote verification, and/or audit process. A skilled artisan having the benefit of this disclosure would understand how the electronic device 100 shown in FIGS. 1A-1D and described herein may be used to securely display a wide variety of paper documents to a user, and perform a wide variety of electronic functions for such paper documents, while preventing the user from touching the documents being displayed.

As shown in FIGS. 1A-1D, the electronic device 100 includes an external housing 150, which encompasses the display device 110, the touch screen 120 and the paper viewing area 130. The external housing 150 may also encompass other components of the electronic device 100. In some embodiments, the external housing 150 may include an input/output (I/O) port 160 configured to receive a paper document 140, and a paper feeder mechanism 170 configured to provide the paper document 140 to the paper viewing area 130, as shown in FIGS. 1B and 1C. In some embodiments, the paper feeder mechanism 170 may provide the paper document 140 received at the I/O port 160 to the paper viewing area 130 to temporarily display the paper document 140 to the user. Once the display and/or review of the paper document 140 is complete, the paper feeder mechanism 170 may subsequently remove the paper document 140 from the paper viewing area 130 via the I/O port 160. For example, the paper document 140 may be output from the I/O port 160 and provided to a user. In some embodiments, a print head and/or a scanner (not shown in FIGS. 1A-1D) may also be included within the external housing 150 to facilitate printing and/or scanning of the paper document 140.

In the electronic device 100 shown in FIGS. 1A-1D, the display device 110 is configured to display information in a portrait mode. When configured in portrait mode, the height (Y-axis) is larger than the width (X-axis) of the display device 110 and the touch screen 120. This enables the display device 110 to display information and/or GUI components in an upper portion 134 of the display device 110 (i.e., a portion of the display positioned above the paper viewing area 130) when a paper document 140 is displayed within the paper viewing area 130, as shown in FIGS. 1A and 1D. However, the display device 110 is not limited to displaying information and/or GUI components in portrait mode, nor is it restricted to displaying information and/or GUI components in only an upper portion 134 of the display device 110.

Figure 2A:
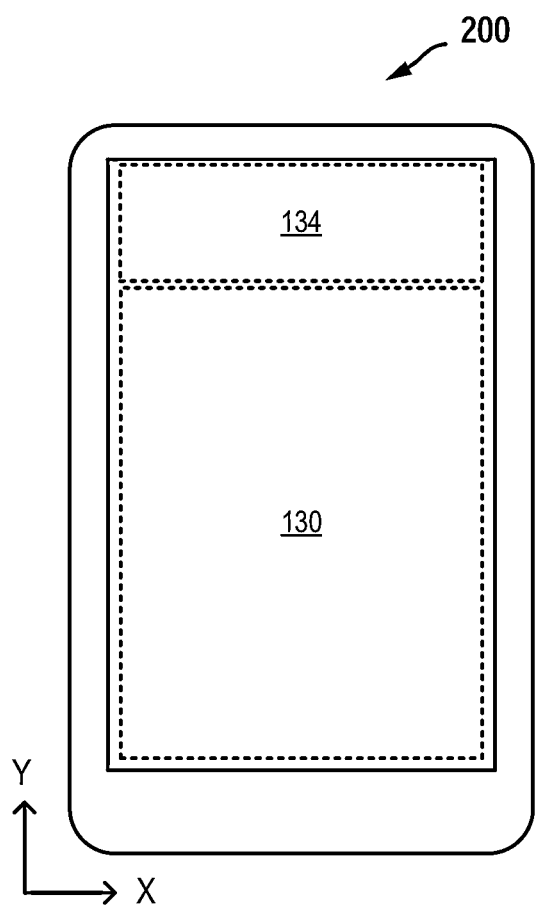
FIGS. 2A-2B illustrate the electronic device of FIG. 1A when the display device is configured in a portrait mode.
Figure 2B:
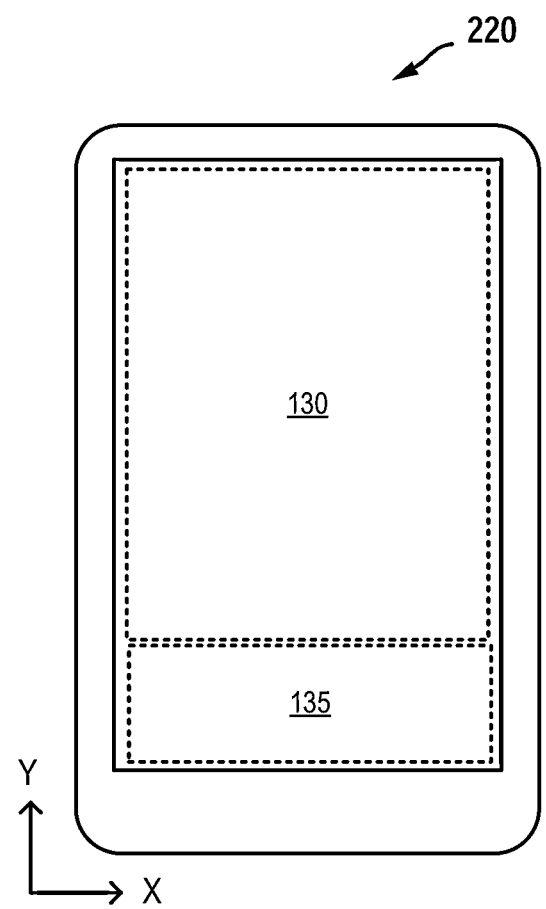

FIGS. 2A-2B illustrate various embodiments of the electronic device 100 shown in FIGS. 1A-1D when the display device 110 is configured in portrait mode. When configured in portrait mode, the height (Y-axis) is larger than the width (X-axis) of the display device 110 and the touch screen 120. This enables the display device 110 to display information and/or GUI components above and/or below the paper viewing area 130 when a paper document 140 is displayed within the paper viewing area 130. In the embodiment 200 shown in FIG. 2A, information and/or GUI components are displayed within an upper portion 134 of the display device 110 (i.e., a portion of the display positioned above the paper viewing area 130) when a paper document 140 is displayed within the paper viewing area 130. In the embodiment 220 shown in FIG. 2B, information and/or GUI components are displayed in a lower portion 135 of the display device 110 (i.e., a portion of the display positioned below the paper viewing area 130) when a paper document 140 is displayed within the paper viewing area 130. In some embodiments, the display device 110 may be configured to display information and/or GUI components above and below the paper viewing area 130 when configured in portrait mode.

Figure 2C:
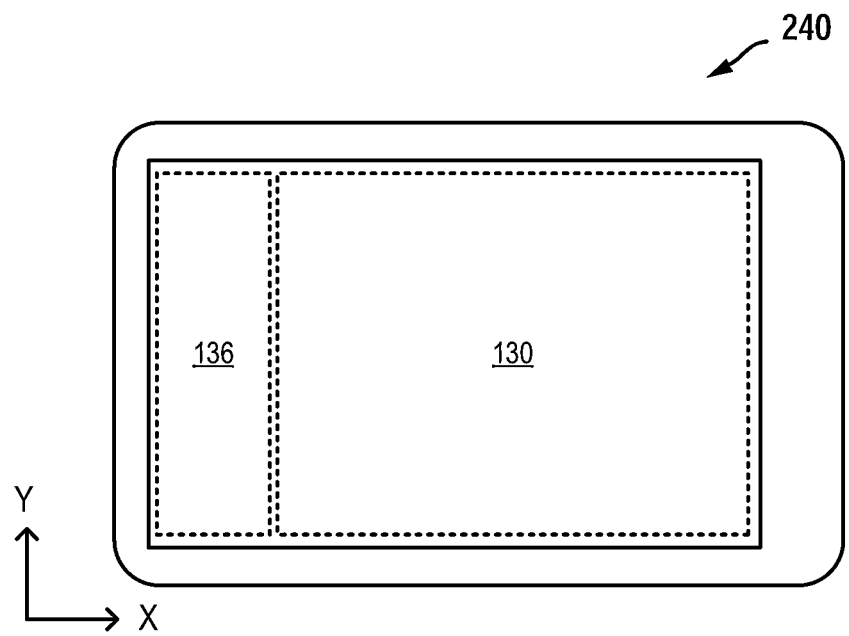
FIGS. 2C-2D illustrate the electronic device of FIG. 1A when the display device is configured in a landscape mode.
Figure 2D:
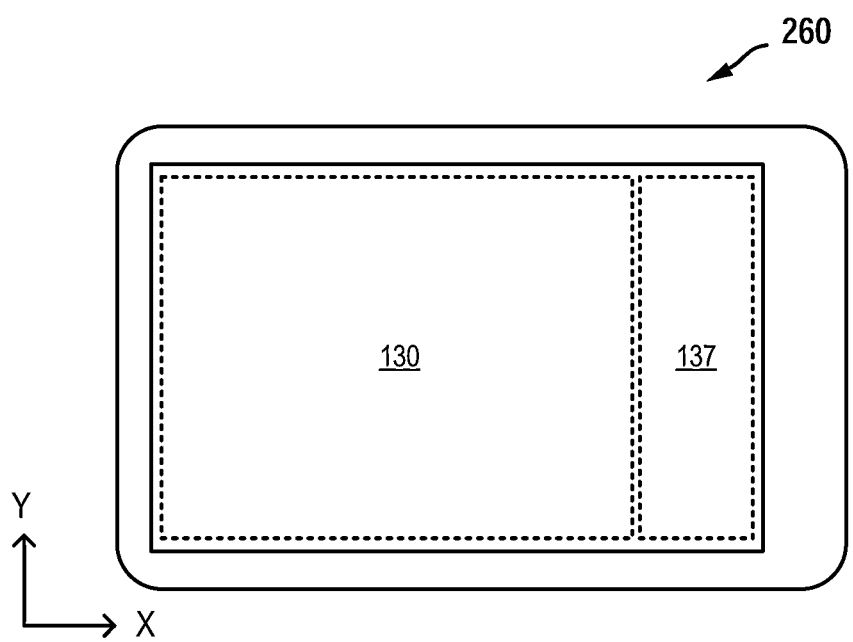

FIGS. 2C-2D illustrate various embodiments of the electronic device 100 shown in FIGS. 1A-1D when the display device 110 is configured in landscape mode. When configured in landscape mode, the width (X-axis) is larger than the height (Y-axis) of the display device 110 and the touch screen 120. This enables the display device 110 to display information and/or GUI components along one or more sides of the paper viewing area 130 when a paper document 140 is displayed within the paper viewing area 130. In the embodiment 240 shown in FIG. 2C, information and/or GUI components are displayed in a left-side portion 136 of the display device 110 (i.e., a portion of the display positioned to the left of the paper viewing area 130) when a paper document 140 is displayed within the paper viewing area 130. In the embodiment 260 shown in FIG. 2D, information and/or GUI components are displayed in a right-side portion 137 of the display device 110 (i.e., a portion of the display positioned to the right of the paper viewing area 130) when a paper document 140 is displayed within the paper viewing area 130. In some embodiments, the display device 110 may be configured to display information and/or GUI components to the left and the right of the paper viewing area 130 when configured in landscape mode.

In the embodiments shown in FIGS. 2A-2D, the paper viewing area 130 is smaller than the surface area 132 of the display device 110 and the touch screen 120, thereby enabling the display device 110 to display information and/or GUI components along one or more sides (e.g., a top, bottom, left and/or right side) of the paper viewing area 130 when a paper document 140 is displayed within the paper viewing area 130. The embodiments shown in FIGS. 2A-2D may be appropriate when display device 110 is implemented as a transparent or non-transparent display device. In other embodiments (not shown), the paper viewing area 130 may encompass most, if not all, of the surface area 132 of the display device 110 and the touch screen 120. In these embodiments, a transparent display device 110 may be used to display information and/or GUI components within the paper viewing area (e.g., overlying the paper document 140) when the paper document 140 is displayed within the paper viewing area 130.

FIGS. 3A-3E illustrate another embodiment of an electronic voting system 300 in accordance with the present disclosure. Similar to the electronic device 100 shown in FIGS. 1A-1D, the electronic voting system 300 shown in FIGS. 3A-3E may generally include a display device 310 configured to display voting information to a voter (or election official), a touch screen 320 overlying the display device 310 and configured to receive touch input from the voter (or election official), and a paper viewing area 330 configured to temporarily display a paper document 340 to the voter (or election official). Like the previously disclosed embodiments, the electronic voting system 300 shown in FIGS. 3A-3E may be generally configured to display paper documents 340 related to voting (e.g., printed records, unmarked paper ballots, marked paper ballots, etc.) within a paper viewing area 330, which coincides with the touch screen 320 and the display device 310. As such, the electronic voting system 300 improves upon conventional electronic voting systems by securely displaying a printed record (or another paper document 340 related to voting) behind the touch screen 320 and/or the display device 310 of the electronic voting system 300.

Many of the components shown in FIGS. 3A-3E are similar to those shown in FIGS. 1A-1D and described above. For example, the display device 310 and touch screen 320 may be similar to the display device 110 and touch screen 120 shown in FIGS. 1A-1D and described above. Although display device 310 is shown in FIGS. 3A-3E as being positioned behind and spaced apart from the touch screen 320, similar to the embodiment shown in FIG. 1B, the display device 310 may be alternatively positioned behind and in contact with the touch screen 320, as shown for example in FIG. 1C. The display device 310 may also be configured in portrait or landscape modes for displaying information and/or GUI components around one or more sides (e.g., along the top, bottom, left and/or right side) of the paper viewing area 330 when a paper document 340 is displayed within the paper viewing area 330, as shown in FIGS. 2A-2D. In some embodiments, the display device 310 may be configured to display information and/or GUI components within the paper viewing area 330 when a paper document 340 is displayed within the paper viewing area 330, as further explained above.

Like the electronic device 100 shown in FIGS. 1A-1D, the electronic voting system 300 shown in FIGS. 3A-3E includes an external housing 350, which encompasses the display device 310, the touch screen 320 and the paper viewing area 330. The external housing 350 may also encompass other components of the electronic device 100, such as an input/output (I/O) port 360 and a paper feeder mechanism 370. In some embodiments, an integrated print head 380 and scanner 385 may be included within the external housing 350. However, the print head 380 and the scanner 385 are optional components, which may be omitted in some embodiments.

Figure 3A:
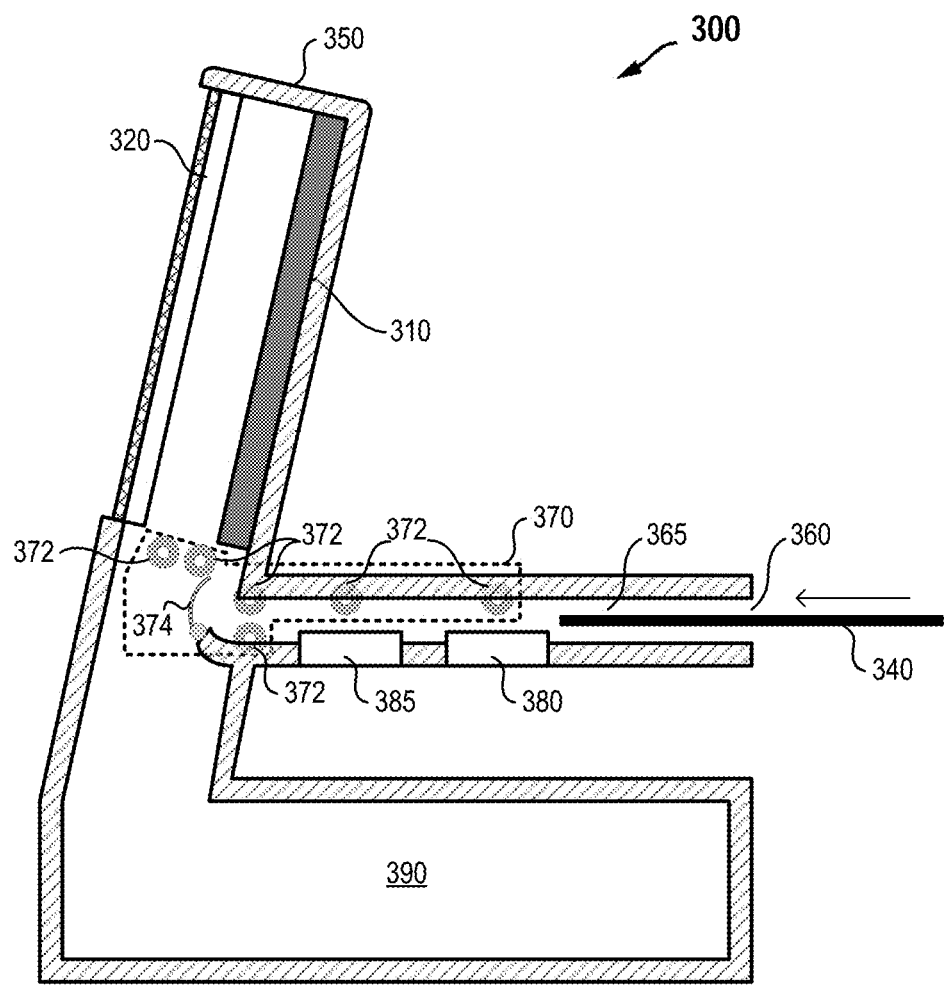
FIGS. 3A-3E are cross-sectional side views through an electronic voting system having a display device, a touch screen and a paper viewing area in accordance with another embodiment of the present disclosure.

The I/O port 360 may be generally configured to receive a paper document 340, as shown for example in FIG. 3A. The paper document 340 received at the I/O port 360 may be a blank sheet, a printed record, an unmarked paper ballot or a hand-marked paper ballot. For example, the I/O port 360 may receive a printed record of the voter's voting selections from an external printer (not shown), or the I/O port 360 may receive a marked or unmarked paper ballot from a voter. In some embodiments, the paper document 340 may be retrieved from the I/O port 360 after it has been displayed within the paper viewing area 330 and reviewed by the voter (or election official). In other embodiments, the paper document 340 may be securely stored within an attached ballot box 390 after voter review, as described in more detail below. In some embodiments, the I/O port 360 shown in FIGS. 3A-3E may be replaced with a paper tray or a paper well (not shown) containing a stack (or roll) of blank paper or a stack of blank (unmarked) paper ballots.

Figure 3B:
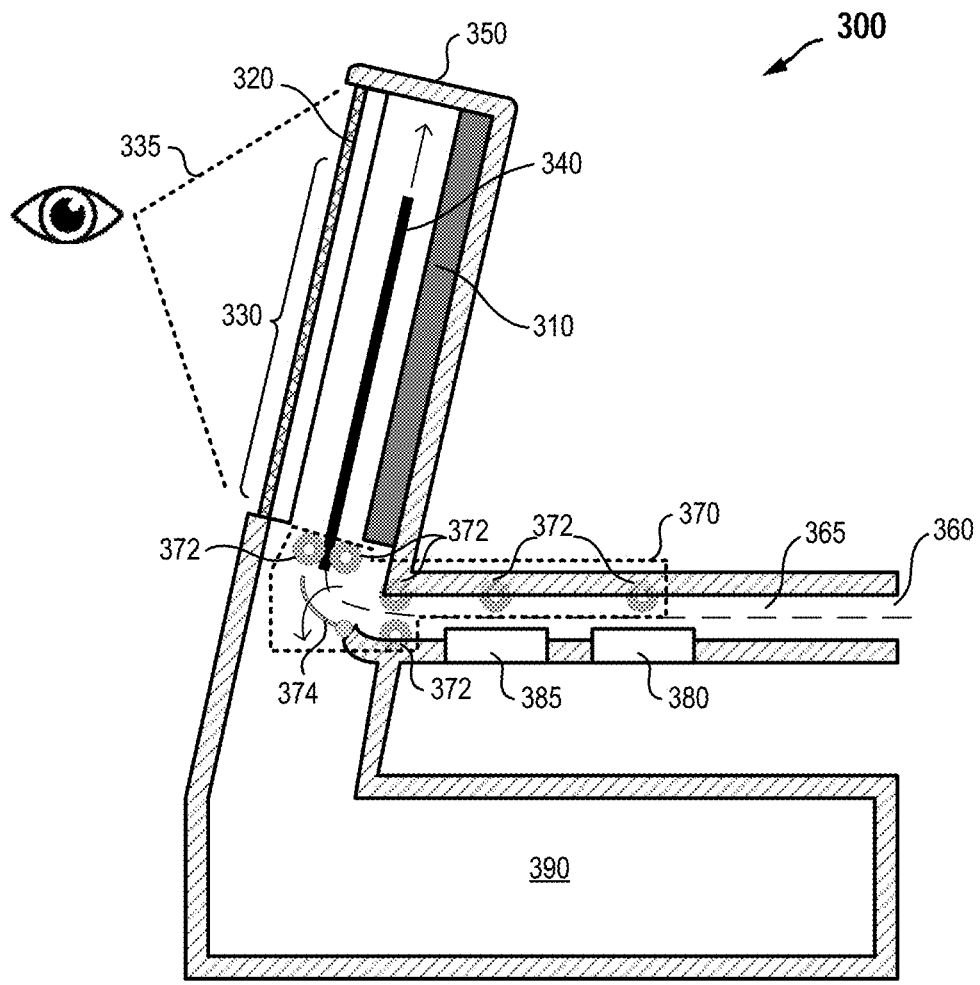

The paper feeder mechanism 370 may be generally configured to provide the paper document 340 to the paper viewing area 330 to temporarily display the paper document 340 to the voter (or election official), as shown for example in FIG. 3B. In the embodiment shown in FIGS. 3A-3E, the paper feeder mechanism 370 includes a plurality of rollers 372 and an articulated trap door 374. The plurality of rollers 372 may be implemented as driver rollers, or a combination of driver rollers and pressure rollers. Driver rollers are mechanically driven rollers, which are connected to a driver motor (via gears and/or belts) and configured to grip and push/pull the paper document 340 along the paper path. Pressure rollers are not mechanically driven. Instead, pressure rollers provide pressure to sandwich the paper document 340 between a pressure roller and a driver roller. In some embodiments, the articulated trap door 374 may be a spring-loaded normally closed door, which prevents the paper document 340 from re-entering the input paper path 365 after the paper document travels past the articulated trap door 374 to the paper viewing area 330. In other embodiments, the articulated trap door 374 may be electrically/mechanically controlled to enable the paper document to re-enter the input paper path 365 after it is displayed in the paper viewing area 330.

When a paper document 340 received from the I/O port 360 (or paper tray/well) first enters the input paper path 365, the plurality of rollers 372 rotate in a first direction to feed the paper document 340 past the optional print head 380 and scanner 385 and through the articulated trap door 374 to the paper viewing area 330, as shown in FIG. 3B. In some embodiments, the paper document 340 may be printed and/or scanned in FIG. 3A before it is displayed within the paper viewing area 330 in FIG. 3B. In other embodiments, the paper document 340 may be printed and/or scanned in FIG. 3C after it is displayed within the paper viewing area 330 in FIG. 3B.

In some embodiments, for example, the paper document 340 received at the I/O port 360 (or paper tray/well) may comprise blank paper or an unmarked paper ballot. When blank paper or an unmarked paper ballot is received in FIG. 3A, the plurality of rollers 372 may rotate in the first direction to feed the blank paper or unmarked paper ballot past the optional print head 380 and scanner 385. In some embodiments, the print head 380 may print the voting selections, which were previously made by a voter via the touch input received from the voter on the touch screen 320, onto the blank paper to generate a printed record containing a summary of the voter's voting selections in FIG. 3A. In other embodiments, the print head 380 may generate another type of printed record (e.g., a machine-marked paper ballot) in FIG. 3A by printing the voter's selections onto the unmarked paper ballot. In some embodiments, the scanner 385 may optionally scan the printed record to collect the voter's selections recorded on the printed record and generate an electronic cast vote record before the printed record is displayed to the voter for review.

After the printed record is generated and optionally scanned, the paper feeder mechanism 370 may feed the printed record through the articulated trap door 374 to the paper viewing area 330, as shown in FIG. 3B. Displaying the printed record within the paper viewing area 330 enables the voter to review and confirm the voting selections recorded on the printed record before casting their ballot. It also enables the voter to discard the ballot (e.g., by touching the "spoil" button 115 shown in FIG. 1A) if the voting selections recorded on the printed record are incorrect or incomplete. After the printed record is displayed within the paper viewing area 330 in FIG. 3B, and the voting selections recorded on the printed record are confirmed by the voter to be correct, the voter may cast their ballot (e.g., by touching the "cast" button 114 shown in FIG. 1A).

As shown in FIG. 3B, the electronic voting system 300 provides a single viewing angle 335 with which a voter can view the printed record and the information and/or GUI components displayed on the display device 310. It also enables the voter to provide touch input to the touch screen 320 (such as, e.g., touching the "cast" or "spoil" button shown in FIG. 1A) while the printed record is displayed within the paper viewing area 330. This prevents the voter from having to divide their attention and redirect their line of sight between different viewing areas, as would be the case if the printed record were instead displayed in a separate hardware device or container positioned alongside the display device.

Figure 3C:
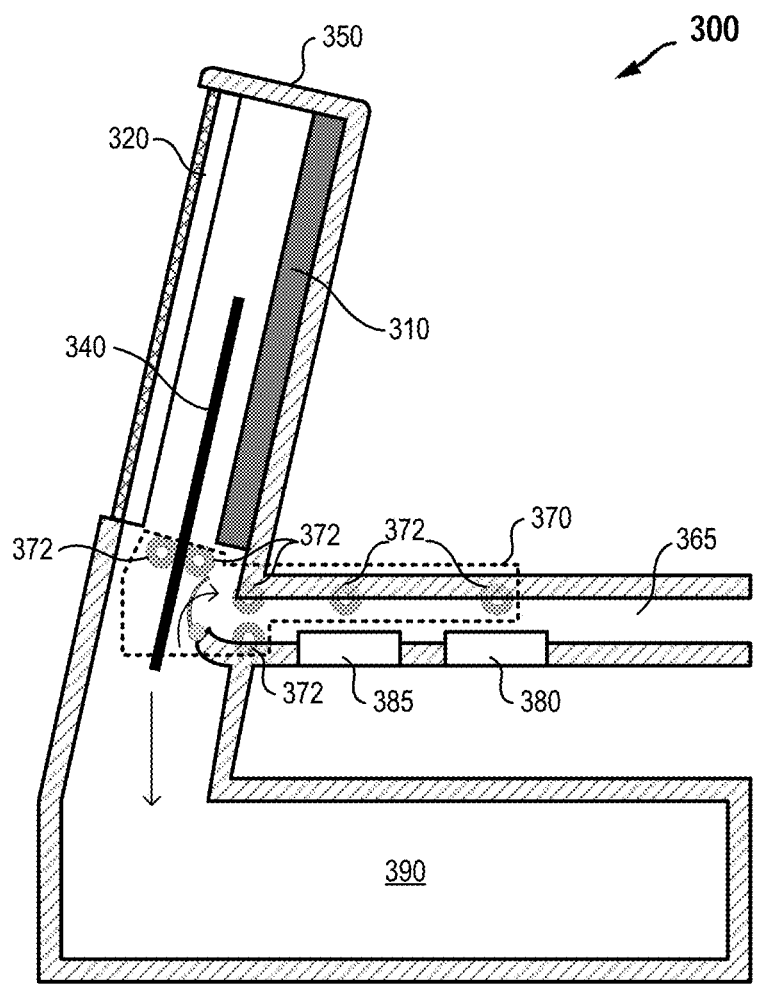

Once the voter's ballot is cast, the paper feeder mechanism 370 may remove the printed record from the paper viewing area 330 by rotating the plurality of rollers 372 in a second direction (which is opposite to the first direction). In some embodiments, the paper feeder mechanism 370 may remove the printed record from the paper viewing area 330 to deposit the printed record within an attached ballot box 390, as shown in FIG. 3C. In such embodiments, the ballot box 390 may provide secure storage for printed records. It is recognized that, although the ballot box 390 is illustrated in FIG. 3C as integrated within the housing 350 of the electronic voting system 300, the ballot box 390 may be alternatively implemented as a separate ballot box, which is attached to the electronic voting system 300.

Figure 3D:
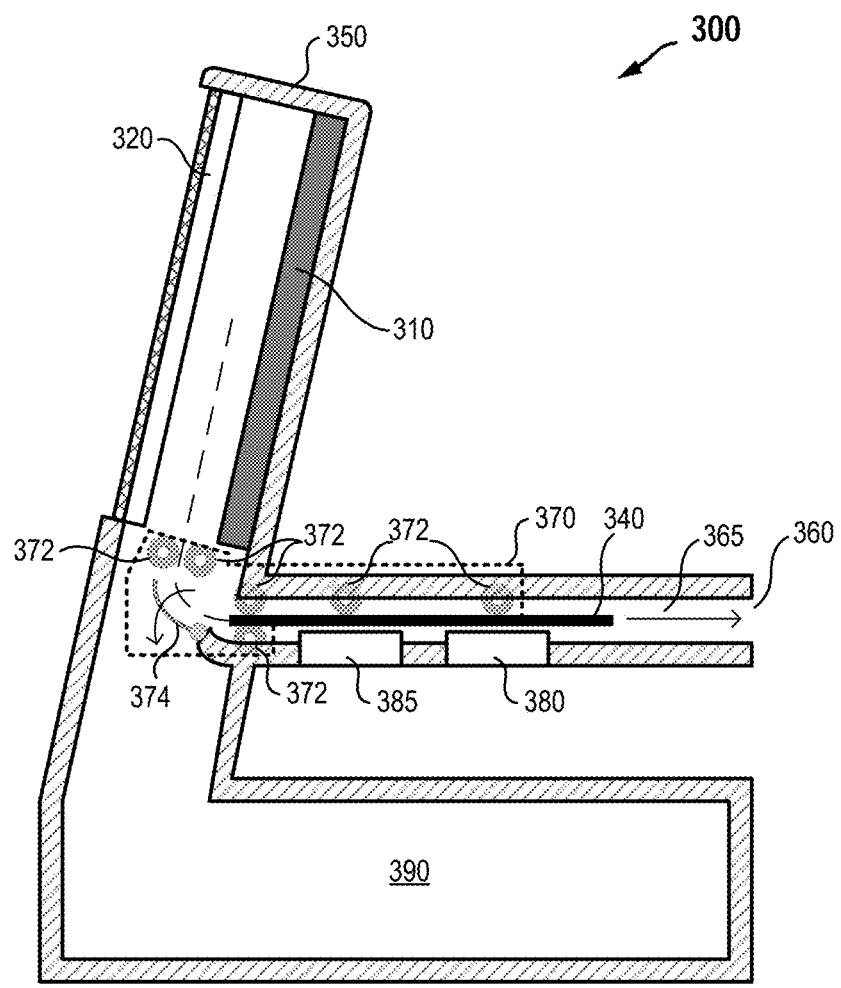

In other embodiments, the plurality of rollers 372 may rotate in the second direction to redirect the printed record back to the input paper path 365 after the printed record is displayed within the paper viewing area 330 in FIG. 3B. This is shown in FIG. 3D. For example, the plurality of rollers 372 may redirect the printed record back to the input paper path 365, as shown in FIG. 3D, so that the printed record can be provided to the voter.

In another example, the plurality of rollers 372 may redirect the printed record back to the input paper path 365 for scanning and generation of an electronic cast vote record, if this step was not previously performed in FIG. 3A. After the scanner 385 scans the printed record to collect the voter's selections recorded on the printed record and generate an electronic cast vote record in FIG. 3D, the plurality of rollers 372 may again rotate in the first direction to feed the printed record past the articulated trap door 374 and deposit the printed record within the integrated ballot box 390, as shown in FIG. 3E.

Figure 3E:
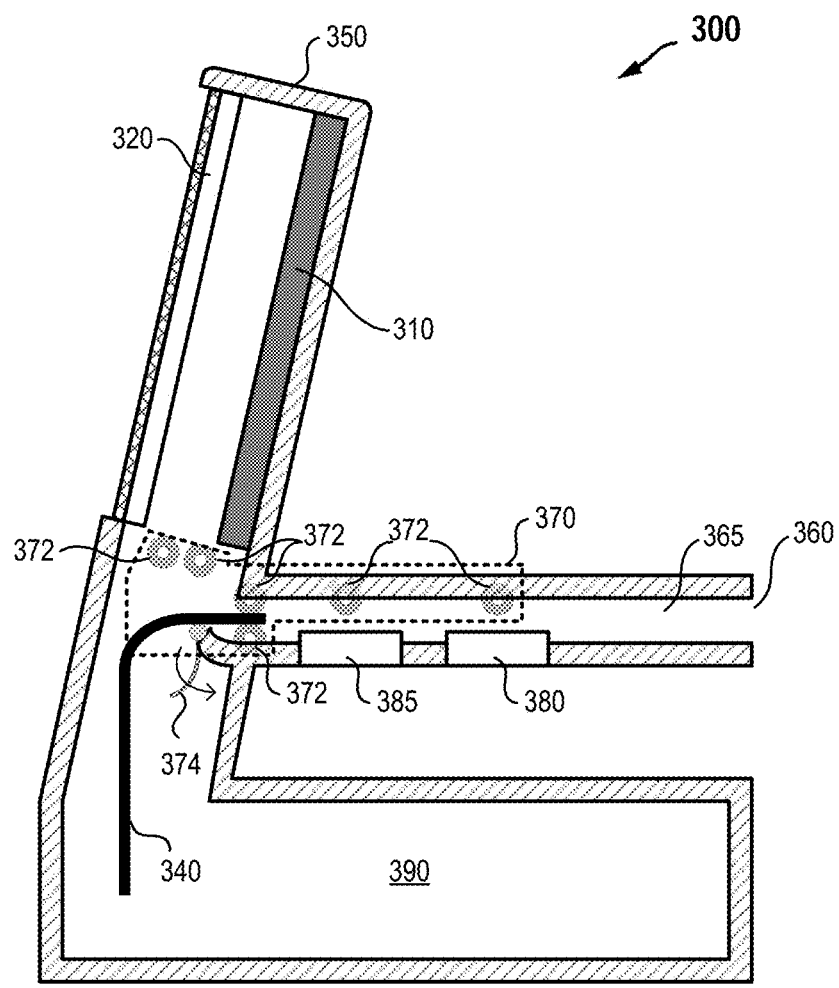

Example process flows are described above and shown in FIGS. 3A-3C, and in FIGS. 3A-3B and 3D-3E, for generating, scanning and displaying printed records within the electronic voting system 300. Alternative process flows are contemplated herein for handling other paper documents 340, such as unmarked paper ballots and hand-marked paper ballots.

For example, an alternative process flow is contemplated for handling unmarked paper ballots. In some embodiments, the paper feeder mechanism 370 may provide an unmarked paper ballot to the paper viewing area 330, so that a voter can make voting selections electronically on the touch screen 320 while the unmarked paper ballot is displayed within the paper viewing area 330 of the electronic voting system 300.

When the unmarked paper ballot enters the input paper path 365 in FIG. 3A, the plurality of rollers 372 rotate in the first direction to feed the unmarked paper ballot past the optional print head 380 and scanner 385, without printing or scanning, through the articulated trap door 374 to the paper viewing area 330, as shown in FIG. 3B. While the unmarked paper ballot is displayed within the paper viewing area 330, a voter may use the touch screen 320 to make voting selections electronically. In some embodiments, the voter's selections may be displayed on the display device 310, if a transparent display device is utilized and positioned in front of the unmarked paper ballot. In other embodiments, the voter's selections may be illuminated by the display device 310 through the unmarked paper ballot, if a non-transparent display device is utilized and positioned behind the unmarked paper ballot.

Once voting selections are complete, the plurality of rollers 372 may rotate in the second direction to remove the unmarked paper ballot from the paper viewing area 330 and redirect the unmarked paper ballot back to the input paper path 365 for printing and/or scanning, as shown in FIG. 3D. For example, the print head 380 may be used to mark the voting selections on the unmarked paper ballot to generate a machine-marked paper ballot. Once the voting selections are marked, the scanner 385 may optionally scan the marked paper ballot to collect the voter's selections recorded on the marked paper ballot and generate an electronic cast vote record, in some embodiments.

Once the marked paper ballot is printed and/or scanned in FIG. 3D, the paper feeder mechanism 370 may then provide the machine-marked paper ballot to the paper viewing area 330, as shown in FIG. 3B. For example, the plurality of rollers 372 may again rotate in the first direction to provide the machine-marked paper ballot to the paper viewing area 330, so that the voter can review and confirm the voting selections printed on the machine-marked paper ballot before casting their ballot via the touch screen 320.

Once the voter's ballot is cast, the paper feeder mechanism 370 may remove the machine-marked paper ballot from the paper viewing area 330 by rotating the plurality of rollers 372 in the second direction. In some embodiments, the paper feeder mechanism 370 may remove the machine-marked paper ballot from the paper viewing area 330 and deposit the marked paper ballot within the ballot box 390, as shown in FIG. 3C. In other embodiments, the paper feeder mechanism 370 may remove the machine-marked paper ballot from the paper viewing area 330 and redirect the machine-marked paper ballot back to the input paper path 365, as shown in FIG. 3D. For example, if the marked paper ballot was not previously scanned, the paper feeder mechanism 370 may redirect the marked paper ballot back to the input paper path 365 for scanning and generation of an electronic cast vote record, as shown in FIG. 3D, before the machine-marked paper ballot is deposited within the ballot box 390, as shown in FIG. 3E. In such embodiments, the ballot box 390 may provide secure storage for machine-marked paper ballots.

Another process flow is contemplated for handling hand-marked paper ballots. When a hand-marked paper ballot enters the input paper path 365 in FIG. 3A, the plurality of rollers 372 rotate in the first direction to feed the hand-marked paper ballot past the optional print head 380 and scanner 385 through the articulated trap door 374 to the paper viewing area 330, as shown in FIG. 3B. In some embodiments, the scanner 385 may be used to collect the voter's selections recorded on the hand-marked paper ballot and generate an electronic cast vote record, prior to displaying the hand-marked paper ballot within the paper viewing area 330 in FIG. 3B. While the hand-marked paper ballot is displayed within the paper viewing area 330, a voter may use the touch screen 320 to confirm their voting selections electronically. After the voting selections on the hand-marked paper ballot are confirmed by the voter to be correct, the voter may cast their ballot (e.g., by touching the "cast" button 114 shown in FIG. 1A).

Once the voter's ballot is cast, the paper feeder mechanism 370 may remove the hand-marked paper ballot from the paper viewing area 330 by rotating the plurality of rollers 372 in the second direction. In some embodiments, the paper feeder mechanism 370 may remove the hand-marked paper ballot from the paper viewing area 330 and deposit the hand-marked paper ballot within the ballot box 390, as shown in FIG. 3C. If the hand-marked paper ballot was not previously scanned, the paper feeder mechanism 370 may redirect the hand-marked paper ballot back to the input paper path 365 for scanning and generation of an electronic cast vote record, as shown in FIG. 3D, before the hand-marked paper ballot is deposited within the ballot box 390, as shown in FIG. 3E. In such embodiments, the ballot box 390 may provide secure storage for hand-marked paper ballots.

Like the electronic device 100 shown in FIGS. 1A-1D, the electronic voting system 300 shown in FIGS. 3A-3D improves upon conventional electronic voting systems by displaying paper documents 340 related to voting (e.g., printed records, unmarked paper ballots, marked paper ballots, etc.) within a paper viewing area 330, which coincides with the touch screen 320 and the display device 310. More specifically, the electronic voting system 300 improves upon conventional electronic voting systems by securely displaying paper documents 340 related to voting behind the touch screen 320 and/or the display device 310 of the electronic voting system 300.

In addition to preventing the voter from touching the paper document 340, the electronic voting system 300 provides a single viewing angle 335 (see, e.g., FIG. 3B) with which a voter can view the paper document 340 and the information displayed on the display device 310. It also enables the voter to provide touch input to the touch screen 320 while the paper document 340 is displayed within the paper viewing area 330. This prevents the voter from having to divide their attention and redirect their line of sight between different viewing areas, as would be the case if the paper document 340 were instead displayed in a separate hardware device or container positioned alongside the display device. Finally, providing a paper viewing area 330, which coincides with the touch screen 320 and the display device 310, enables the size of the electronic voting system 300 to be reduced compared to conventional electronic voting systems that display printed records "under glass" in a separate hardware device or container positioned alongside the display device. In some cases, the size of the display device 310 may also enable full-size paper documents (e.g., printed records recorded on larger width paper sizes, such as 8.5" wide paper) to be displayed "under glass" rather than the 3"-4" paper strips, which are typically used in conventional "under glass" systems to display limited amounts of voting information.

In some embodiments, the electronic voting system 300 shown in FIGS. 3A-3E may improve upon the electronic device 100 shown in FIGS. 1A-1D by providing an integrated print head 380, an integrated scanner 385 and attached ballot box 390. Other components not shown in FIGS. 3A-3E may also be included within the electronic voting system 300. In other embodiments, the print head 380 and/or the scanner 385 may be omitted from the electronic voting system 300.

In one particular embodiment, the integrated scanner 385 may be included within the electronic voting system 300, the integrated print head 380 may be omitted, and an external printer may be used to generate a printed record of the voter's voting selections. In some embodiments, the printed record generated by the external printer may be hand-delivered to the I/O port 360 of the electronic voting system 300 for scanning and review. In other embodiments, an automatic document feeder (ADF) may be adaptively coupled between the external printer and the electronic voting system 300 to automatically transfer the printed record from the external printer to the I/O port 360 of the electronic voting system 300 without human intervention. One embodiment of an ADF that may be utilized for this purpose is described in co-pending U.S. patent application Ser. No. 17/555,811, which is filed Dec. 20, 2021, entitled "Printed Vote Record Systems, Retrofit Automatic Document Feeders and Methods to Transfer a Printed Vote Record Sheet from a Legacy Printer to a Legacy Scanner Without Human Intervention", and herein incorporated in its entirety by reference.

Figure 4:
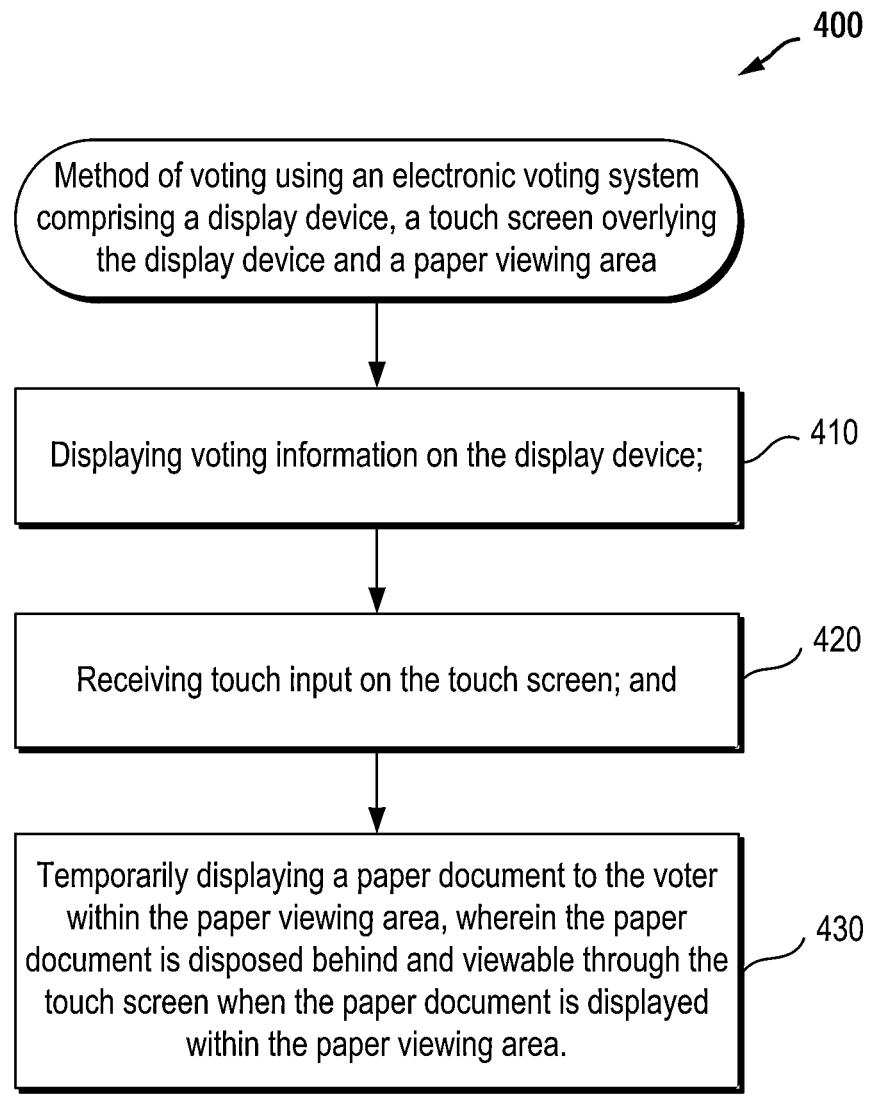
FIG. 4 is a flow chart diagram illustrating one embodiment of a method of voting that uses an electronic voting system in accordance with the present disclosure.

FIG. 4 illustrates one embodiment of a method of voting in accordance with the present disclosure. The method 400 shown in FIG. 4 uses an electronic voting system comprising a display device, a touch screen overlying the display device and a paper viewing area. Examples of electronic voting systems that may be used in method 400 are shown in FIGS. 1A-1D, 2A-2D and 3A-3E and described above. Although example configurations are provided herein, one skilled in the art having the benefit of this disclosure would understand how other electronic voting systems having a display device, a touch screen overlying the display device and a paper viewing area, as described herein, may be used in method 400.

It will be recognized that the embodiment shown in FIG. 4 is exemplary and additional methods may utilize the techniques described herein. Further, additional steps may be added to the method shown in the FIG. 4 as the steps described are not intended to be exclusive. Moreover, the order of the steps is not limited to the order shown in FIG. 4 as different orders may occur and/or various steps may be performed in combination or at the same time.

The method 400 shown in FIG. 4 may generally include displaying voting information on the display device (in step 410); receiving touch input on the touch screen (in step 420); and temporarily displaying a paper document within the paper viewing area (in step 430). In the method 400 shown in FIG. 4, the paper document may be disposed behind and viewable through at least the touch screen when the paper document is displayed within the paper viewing area (in step 430).

In some embodiments, The paper viewing area may be smaller than the surface area of the display device and the touch screen, as shown for example in FIGS. 1A-1D and 3A. In such embodiments, the voting information displayed in step 410 may be displayed around a periphery of the paper viewing area when the paper document is displayed within the paper viewing area. For example, the voting information displayed in step 410 may be displayed around one or more sides (e.g., along the top, bottom, left and/or right side) of the paper viewing area 130 when a paper document is displayed within the paper viewing area 130, as shown in FIGS. 2A-2D. Alternatively, the voting information displayed in step 410 may be displayed alongside the paper viewing area when the paper document is displayed within the paper viewing area.

In some embodiments, said receiving touch input in step 420 may include receiving voting selections from a voter via the touch input received on the touch screen. In some embodiments, the touch input received in step 420 may be received across the entire surface area of the touch screen.

In some embodiments, said temporarily displaying a paper document in step 430 may include temporarily displaying a printed record of the voting selections within the paper viewing area, so that the voter can review the voting selections recorded on the printed record before casting their vote via the touch screen. In other embodiments, said temporarily displaying a paper document in step 430 may include temporarily displaying an unmarked paper ballot within the paper viewing area, so that the voter can make the voting selections via the touch input received on the touch screen.

In other embodiments, method 400 may further include generating a machine-marked paper ballot by printing the voting selections on the unmarked paper ballot. In such embodiments, said temporarily displaying a paper document in step 430 may further include temporarily displaying the machine-marked paper ballot within the paper viewing area, so that the voter can review the voting selections on the machine-marked paper ballot before casting their vote via the touch screen.

Other advantages may be apparent to those skilled in the art in view of this description. In addition, further modifications and alternative embodiments of the inventions described herein will be apparent to those skilled in the art in view of this description. Accordingly, this description is to be construed as illustrative only and is for the purpose of teaching those skilled in the art the manner of carrying out the inventions. It is to be understood that the forms and methods of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this description of the inventions.

What is claimed is:

1. An electronic voting system, comprising:
   a display device configured to display voting information and/or graphical user interface (GUI) components to a user;
   a touch screen overlying the display device and configured to receive touch input from the user, wherein the display device is positioned behind and spaced apart from the touch screen;
   a paper viewing area configured to display a paper document behind a transparent surface, which prevents the user from touching the paper document, wherein the paper viewing area coincides with the touch screen and the display device, but is smaller than a surface area of the display device, and wherein the paper document is: (a) disposed between the touch screen and the display device and (b) disposed behind and viewable through the touch screen when the paper document is displayed within the paper viewing area; and
   an external housing encompassing the display device, the touch screen and the paper viewing area;
   wherein when the paper document is displayed within the paper viewing area, the display device displays the voting information and/or the GUI components along one or more sides of the paper viewing area that are adjacent to, but not overlapping, the paper viewing area, such that the voting information and/or the GUI components displayed on the display device does not overlap the paper document displayed within the paper viewing area.

2. The electronic voting system of claim 1, wherein the touch screen comprises a touch screen overlay positioned above and in contact with the transparent surface.

3. The electronic voting system of claim 2, wherein the paper document is disposed behind and viewable through the touch screen when the paper document is displayed within the paper viewing area.

4. The electronic voting system of claim 1, wherein the paper document is a printed record of voting selections previously made by a voter via the touch input received on the touch screen, wherein the printed record is displayed within the paper viewing area to enable the voter to review the voting selections recorded on the printed record before casting their vote via the touch screen, and wherein the display device is configured to display the GUI components along the one or more sides of the paper viewing area when the paper document is displayed within the paper viewing area to assist the voter in reviewing the voting selections recorded on the printed record.

5. The electronic voting system of claim 4, wherein the GUI components comprise a display element overlying the voting selections recorded on the printed record and one or more buttons, which enable the voter to scroll the display element through the voting selections recorded on the printed record.

6. The electronic voting system of claim 5, wherein the GUI components further comprise a text box, wherein as the display element scrolls through the voting selections recorded on the printed record, a voting selection currently highlighted by the display element is displayed in the text box for voter review.

7. The electronic voting system of claim 5, wherein the electronic voting system is configured to provide audio feedback of the voting selections as the display element scrolls through the voting selections recorded on the printed record.

8. An electronic voting system, comprising:
   a display device configured to display voting information;
   a touch screen overlying the display device and configured to receive touch input, wherein the display device is positioned behind and spaced apart from the touch screen; and
   a paper viewing area configured to temporarily display a paper document, wherein the paper document is disposed between the touch screen and the display device and viewable through the touch screen when the paper document is displayed within the paper viewing area;
   wherein the paper viewing area is smaller than a surface area of the display device; and
   wherein when the paper document is displayed within the paper viewing area, the paper document and the voting information displayed on the display device are viewable at the same time.

9. The electronic voting system of claim 8, wherein the display device is configured to display the voting information and/or graphical user interface (GUI) components along one or more sides of the paper viewing area when the paper document is displayed within the paper viewing area.

10. The electronic voting system of claim 8, wherein the touch screen is configured to receive the touch input across the surface area of the touch screen.

11. The electronic voting system of claim 8, further comprising an external housing encompassing the display device, the touch screen, and the paper viewing area.

12. The electronic voting system of claim 11, further comprising a paper feeder mechanism included within the external housing, wherein the paper feeder mechanism is configured to provide the paper document to the paper viewing area to temporarily display the paper document, and subsequently remove the paper document from the paper viewing area.

13. The electronic voting system of claim 11, wherein the paper document is a printed record of voting selections previously made by a voter via the touch input received on the touch screen, and wherein the printed record is displayed within the paper viewing area to enable the voter to review the voting selections recorded on the printed record before casting their vote via the touch screen.

14. The electronic voting system of claim 13, further comprising a print head included within the external housing, wherein the print head is configured to generate the printed record.

15. The electronic voting system of claim 13, further comprising an external printer configured to generate the printed record, wherein the printed record generated by the external printer is provided to the electronic voting system via an input/output (I/O) port on the external housing.

16. The electronic voting system of claim 11, wherein the paper document is an unmarked paper ballot, and wherein the unmarked paper ballot is displayed within the paper viewing area to enable a voter to make voting selections via the touch screen.

17. The electronic voting system of claim 16, further comprising a print head included within the external housing, wherein the print head is configured to print the voting selections on the unmarked paper ballot to generate a machine-marked paper ballot, and wherein the machine-marked paper ballot is displayed within the paper viewing area to enable the voter to review the voting selections printed on the machine-marked paper ballot before casting their vote via the touch screen.

18. The electronic voting system of claim 16, further comprising an external printer configured to print the voting selections on the unmarked paper ballot to generate a machine-marked paper ballot, wherein the machine-marked paper ballot generated by the external printer is provided to the electronic voting system via an input/output (I/O) port on the external housing, and wherein the machine-marked paper ballot is displayed within the paper viewing area to enable the voter to review the voting selections printed on the machine-marked paper ballot before casting their vote via the touch screen.

19. A method of voting using an electronic voting system comprising a display device, a touch screen overlying the display device and a paper viewing area, the method comprising:
displaying voting information on the display device;
receiving touch input on the touch screen; and
temporarily displaying a paper document within the paper viewing area, wherein the paper viewing area is smaller than a surface area of the display device, and wherein the paper document is disposed behind and viewable through the touch screen when the paper document is displayed within the paper viewing area; and
wherein when the paper document is displayed within the paper viewing area, said displaying voting information comprises displaying the voting information along one or more sides of the paper viewing area that are adjacent to, but not overlapping, the paper viewing area,
wherein the display device is positioned behind and spaced apart from the touch screen, and wherein the method further comprises disposing the paper document between the touch screen and the display device, such that the paper document is viewable through the touch screen when the paper document is displayed within the paper viewing area.

20. The method of claim 19, wherein said receiving touch input comprises receiving the touch input across the surface area of the touch screen.

21. The method of claim 19, wherein said receiving touch input comprises receiving voting selections from a voter via the touch input received on the touch screen.

22. The method of claim 21, wherein said temporarily displaying a paper document comprises temporarily displaying a printed record of the voting selections within the paper viewing area, so that the voter can review the voting selections recorded on the printed record before casting their vote via the touch screen.

23. The method of claim 22, further comprising displaying graphical user interface (GUI) components along the one or more sides of the paper viewing area when the printed record is displayed within the paper viewing area to assist the voter in reviewing the voting selections recorded on the printed record.

24. The method of claim 23, wherein said displaying the GUI components comprises displaying a display element overlying the voting selections recorded on the printed record, and displaying one or more buttons utilized by the voter to scroll the display element through the voting selections recorded on the printed record.

25. The method of claim 24, wherein said displaying GUI components further comprises displaying a text box, and wherein the method further comprises displaying, within the text box, a voting selection currently highlighted by the display element as the display element scrolls through the voting selections recorded on the printed record.

26. The method of claim 24, further comprising providing audio feedback of the voting selections to the voter as the display element scrolls through the voting selections recorded on the printed record.

27. The method of claim 21, wherein said temporarily displaying a paper document comprises temporarily displaying an unmarked paper ballot within the paper viewing area, so that the voter can make the voting selections via the touch input received on the touch screen.

28. The method of claim 27, further comprising generating a machine-marked paper ballot by printing the voting selections on the unmarked paper ballot, and wherein said temporarily displaying a paper document further comprises temporarily displaying the machine-marked paper ballot within the paper viewing area, so that the voter can review the voting selections on the machine-marked paper ballot before casting their vote via the touch screen.

* * * * *